United States Patent [19]

Tomforde

[11] Patent Number: 4,697,843
[45] Date of Patent: Oct. 6, 1987

[54] ANTI-GLARE DEVICE FOR MOTOR VEHICLES

[75] Inventor: Johann Tomforde, Sindelfingen, Fed. Rep. of Germany

[73] Assignee: Daimler-Benz, Stuttgart, Fed. Rep. of Germany

[21] Appl. No.: 934,869

[22] Filed: Nov. 25, 1986

[30] Foreign Application Priority Data

Nov. 27, 1985 [DE] Fed. Rep. of Germany ....... 3441902

[51] Int. Cl.$^4$ .............................................. B60J 3/02
[52] U.S. Cl. ............................... 296/97 G; 296/97 K; 296/97 J
[58] Field of Search .................. 296/97 G, 97 K, 97 J

[56] References Cited

U.S. PATENT DOCUMENTS

| | | | |
|---|---|---|---|
| 3,226,152 | 12/1965 | Reuther | 296/97 J |
| 4,205,873 | 1/1980 | Viertel et al. | 296/97 G |
| 4,491,360 | 1/1985 | Fleming | 296/97 G |
| 4,492,404 | 1/1985 | Marcus et al. | 296/97 J |
| 4,512,605 | 4/1985 | Aschermann | 296/97 G |
| 4,558,899 | 12/1985 | Chu et al. | 296/97 G |

FOREIGN PATENT DOCUMENTS 2724414  7/1979  Fed. Rep. of Germany .

*Primary Examiner*—Robert R. Song

[57] ABSTRACT

In an anti-glare device for motor vehicles, a sun visor, which is arranged on the under-side of the front hollow transverse roof beam, can be displaced from a basic position, in which the sun visor is located approximately beneath the transverse roof beam, into an extended position, in which the sun visor projects into the region of the windscreen. In order to displace the sun visor a guide linkage is provided, which influences the sliding path of the sun visor and which is fastened within the cavity of the transverse roof beam. A drive means is further provided within the cavity of the transverse roof beam, which adjusts the sun visor by a corresponding control via the guide linkage or a displacing lever. By virtue of the described anti-glare device, an infinite and automatic adjustment of the sun visor is possible, by means of a switch fitted to the steering wheel, for example.

19 Claims, 1 Drawing Figure

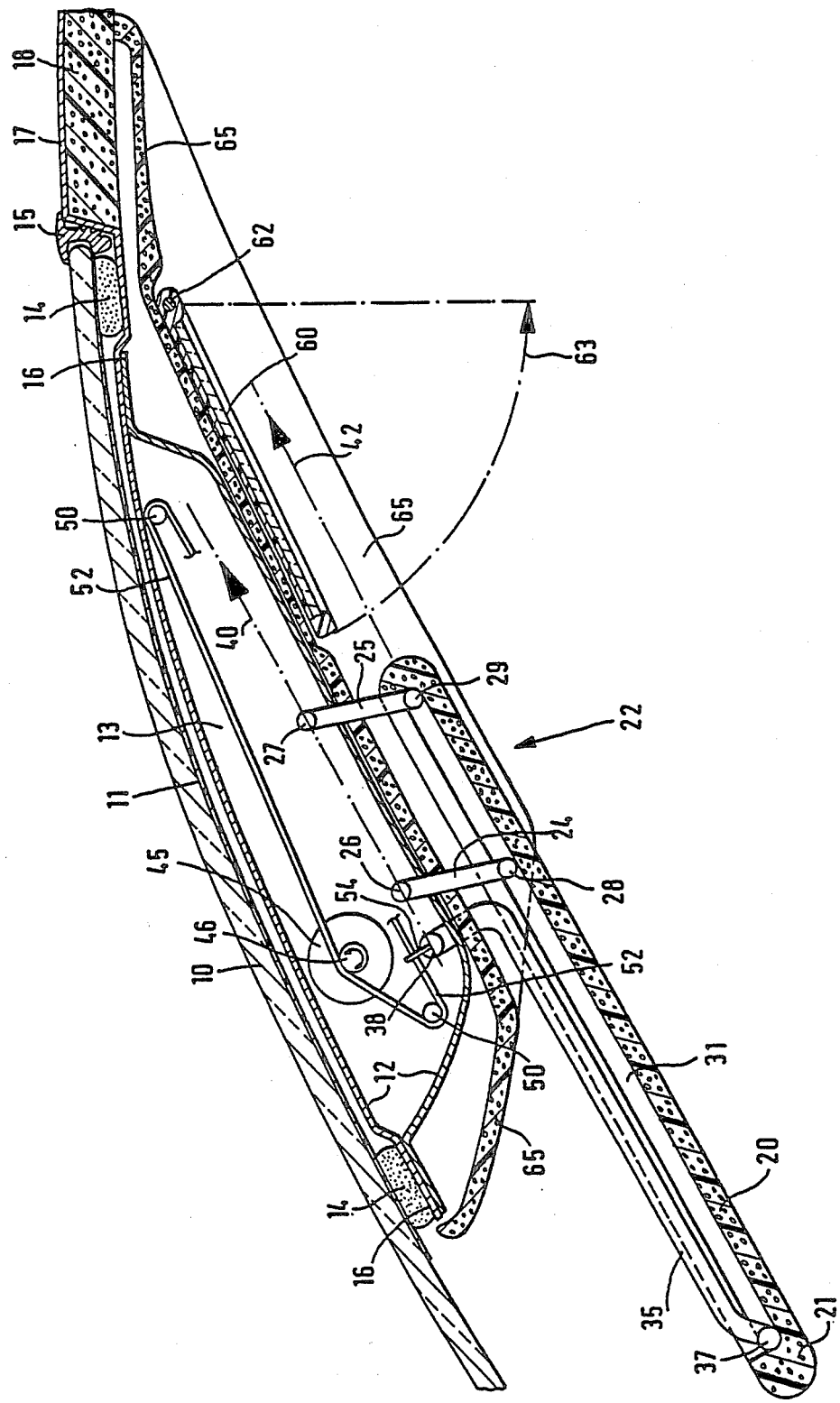

ANTI-GLARE DEVICE FOR MOTOR VEHICLES

BACKGROUND AND SUMMARY OF THE INVENTION

The invention relates to an anti-glare device for motor vehicles of the type with at lease one sun visor arranged on the under-side of a hollow transverse roof beam located in the region of the windscreen, which device is displaceable from a basic position, in which the sun visor is located approximately beneath the transverse roof beam, into an extended position, in which the sun visor projects into the region of the windscreen, while a guide linkage is provided for the sun visor.

Such an anti-glare device for motor vehicles has been contemplated. There a sun visor in its basic position is arranged beneath the front transverse roof beam of a motor vehicle. The sun visor can be brought into a position projecting into the region of the windscreen by pivoting. A guide linkage, to which the sun visor is articulated, is provided for this purpose.

An aim of the invention is to develop such an anti-glare device so that, using simple means which occupy the smallest amount of space inside the motor vehicle, an automatic and infinite adjustment of the sun visor is possible.

This aim is achieved according to the invention by providing that the guide linkage is connected articulately within the cavity of the transverse roof beam and is movable by a drive means arranged in the cavity.

Due to the articulate connection and arrangement of the guide linkage and of the guide means in the cavity of the transverse roof beam, the space requirements of the devices for adjusting the sun visor are transferred out of the interior space of the motor vehicle into the transverse roof beam cavity. The existing interior space of the motor vehicle is therefore not reduced. Simultaneously, the possibility of a simple infinite adjustment of the sun visor is created by the use of the guide linkage.

It is convenient according to certain preferred embodiments if a displacing lever is provided which is connected to the sun visor and to the drive means. By this means it is possible to effect the adjustment of the sun visor by actuating the displacing lever. By a corresponding modulation of the drive means the sun visor can be adjusted automatically by the user via the displacing lever. By means of appropriate drive means it is possible to perform the adjustment infinitely. All the components which effect the adjustment of the sun visor are integrated with space economy in the cavity of the transverse roof beam.

In a further development of the anti-glare device according to the invention, at least one guide lever is provided as guide linkage, which is fitted within the cavity of the transverse roof beam pivotably to a fastening bolt or the like, and the free end of which projecting out of the cavity is guided in a guide groove of the sun visor, which is arranged parallel to a transverse side of the sun visor. This further development achieves an extremely simple construction of the guide linkage. The sliding path of the sun visor in this further development is determined by the guide lever and the displacing lever. It is convenient to attach the displacing lever on a fastening pin pivotably at the end of the sun visor remote from the roof. In this way a pivoting of the sun visor is permited on the one hand, simultaneously the stability of the mounting of the sun visor is improved on the other hand.

In a further development of the invention, a stationary electric motor is provided as drive means, which adjusts via a drive shaft an actuating means which influences the displacing lever. It is advantageous to provide as actuating means a band passed over return pulleys, on which the displacing lever is retained by a coupling piece. By a modulation of the electric motor, the band, and hence the displacing lever retained thereon, is drawn in the one or other direction. This effects a displacement of the sun visor. It is convenient to attach the device for modulating the electric motor within reach of the user, therefore, for example, on the dashboard of the motor vehicle and/or on its steering wheel.

Other objects, advantages and novel features of the present invention will become apparent from the following detailed description of the invention when considered in conjunction with the accompanying drawings.

BRIEF DESCRIPTION OF THE DRAWINGS

The sole FIGURE of the drawing shows in a diagrammatic view a longitudinal section through the transition region from the windscreen to the roof of a motor vehicle, with an anti-glare device constructed in accordance with a preferred embodiment of the invention.

DETAILED DESCRIPTION OF THE DRAWINGS

In the drawing a gently curved windscreen 10 exhibits a coating 11 in its upper region and on its side facing the interior of the vehicle, due to which coating 11 the windscreen 10 is substantially opaque or non-transparent in this region. Arranged approximately beneath the upper region of the windscreen 10 is a transverse roof beam 12 which comprises a hollow profile which has a substantially oval cross-section. The longitudinal extension of the cross-section of the transverse roof beam 12 is arranged substantially parallel to the longitudinal extension of the windscreen 10, while the wall of the transverse roof beam facing the windscreen 10 has approximately the same curvature as the windscreen 10. The tansverse roof beam 12 is totally covered by the windscreen, while due to the coating 11, the transverse roof beam 12 is not visible to any observer positioned outside the motor vehicle.

Straps 16, which are fitted to the ends of the longitudinal extension of the cross-section of the transverse roof beam 12, are oriented approximately parallel to the curvature of the windscreen 10 and an adhesive bead 14 is attached to each of them. The adhesive beads 14 are simultaneously in contact with the windscreen 10, whereby the windscreen 10 is connected firmly to the transverse roof beam 12. At the end of the longitudinal extension of the cross-section of the transverse roof beam 12 adjacent to the end of the windscreen 10, a roof part 17 is attached to the strap 16 and its shape substantially continues the contour created by the curvature of the windscreen 10. The interstice between the windscreen 10 and the roof part 17 is marked by a decorative molding 15. A roof canopy lining 18 is provided on the side of the roof part 17 facing the interior of the vehicle.

A displaceable sun visor 20, which is retained by a guide linkage 22, is located approximately parallel to the wall of the transverse roof beam 12 remote from the windscreen 10. The guide linkage 22 comprises two guide levers 24 and 25, which project outwardly from the casing 13 of the transverse roof beam 12 through a corresponding aperture. The guide levers 24 and 25 are attached pivotably to the transverse roof beam 12 by means of fastening bolts 26 and 27. At their ends projecting out of the cavity 13 they have guide pins 28 and 29 which engage in a guide groove 31 of the sun visor 20. The two guide levers 24 and 25 are of equal length and are arranged substantially mutually parallel. The guide groove 31 is located on the transverse side of the sun visor 20 and extends along substantially the total extension of this transverse side.

A displacing lever 35 is mounted pivotably by means of a fastening pin 37 at the end 21 of the sun visor 20 remote from the roof of the motor vehicle. The displacing lever 35, starting from its fastening to the sun visor 20, is oriented approximately parallel thereto in a straight line, then bent at right angles to project through a corresponding slot into the cavity 13 of the transverse roof beam 12.

The sun visor 20 is illustrated in its extended position in the drawing, it therefore projects into the region of the windscreen 10. It is retained in this position by the displacing lever 35 and the two guide levers 24 and 25, while the guide lever 25 is in contact by its guide pin 29 with the end of the guide groove 31. When the displacing lever 35 is moved in the direction of the sliding path 40, the sun visor 20 passes from its extended position into its basic position. The latter is located approximately beneath the transverse roof beam 12 and is not illustrated in the drawing. The transition of the sun visor 20 from the extended position into the basic position passes along the sliding path 42. During the displacement of the sun visor 20, only the displacing lever 35 changes its location, but not the two guide levers 24 and 25. The ends of guide levers 24 and 25 at the visor thus slide along the visor during movement of visor 20. The guide levers 24 and 25 only pivot about the axes formed by the two fastening bolts 26 and 27. The sliding of the sun visor 20 into the basic position is limited by the fact that the guide pin 28 of the guide lever 24 strikes against the end of the guide groove 31 facing the end 21 of the sun visor 20.

An electric motor 45 is fastened in the cavity 13 of the transverse roof beam 12. A continuous band 52 is passed over a drive shaft 46 of the electric motor 45, and its path is further determined by two return pulleys 50. The two return pulleys 50 are located at the two ends of the longitudinal extension of the cross-section of the transverse roof beam 12. The side of the band 52 facing the sun visor is aligned approximately parallel to the sliding path 40 of the displacing lever 35. The band 52 is connected firmly to the free end of the displacing lever 35 projecting into the cavity 13 by means of a coupling piece 54.

Due to the fastening of the displacing lever 35 to the bank 52, a corresponding control/operation of the electric motor 45 causes the displacing lever 35 and therefore the sun visor 20 to be moved along the sliding path 40 or 42 respectively. By a corresponding control, the electric motor 45 can then displace the sun visor 20 in both directions. The length of the sliding path 40 or 42 respectively is a function of the interval of the two return pulleys 50. This interval must therefore be adapted to the desired extended position of the sun visor 20. In order to prevent damage to the electric motor 45 due to the stops of the sun visor 20 in its basic position and extended position, a slip coupling may be provided between the electric motor 45 and the band 52. It is possible to profile the band 52 so that the band 52 is moved reliably in the one or other direction by the output shaft 46, according to preferred embodiments of the invention.

Altogether, the anti-glare device so far described permits the sun visor 20 to be adjusted infinitely and automatically by a corresponding control of the electric motor 45. It is convenient to arrange the controlling devices for the electric motor 45 within reach of the user, that is to say, particularly the driver of the motor vehicle. This may be on the dashboard of the motor vehicle, or directly on its steering wheel, for example. In a simple embodiment, this control device may be, for example, a push button or a toggle switch for actuation in two directions.

A transverse roof beam casing 65 to mask the transverse roof beam 12 is provided between the latter and the sun visor 20. It covers the entire transverse roof beam 12 and ends at the windscreen 10 on the one hand, and at the roof canopy line 18 on the other hand. The transverse roof beam casing 65 exhibits a recess adapted to the contour of the sun visor 20. By this means the sun visor 20, in its basic position, is embedded flush into the transverse roof beam casing 65.

A vanity mirror 60 is provided between the sun visor 20 and the transverse roof beam casing 65 in the upper region of the transverse roof beam 12. As for the sun visor 20, so also for the vanity mirror 60, the transverse roof beam casing 65 is formed so that the vanity mirror 60, in its folded position, terminates approximately flush with the transverse roof beam casing 65. When the sun visor 20 occupies its extended position, it is possible to unfold the vanity mirror 60 about a shaft 62. The pivoting range of the vanity mirror 60 is designated by the reference numeral 63 in the drawing. In the unfolded position of the vanity mirror 60, the sun visor 20 cannot be moved into its basic position. The latter is possible only when the vanity mirror 60 is folded, as illustrated in the drawing. In this state the vanity mirror 60 is masked by a sun visor 20 moved into its basic position, which simultaneously affords protection to the occupants of the vehicle from glass splinters in the case of a mirror broken due to an accident, for example.

In the exemplary embodiment of the invention illustrated in the drawing, the displacing lever 35 is displaced by an electric motor 45 via a band 52. It is also contemplated according to other embodiments to displace the sun visor 20 directly by an influence upon the guide linkage 22. It is also contemplated to use, instead of the band 52, a guided rack for example, which is connected to the guide lever 35 and/or to the guide linkage 52 and meshes with a gear fastened on the output shft 46 of the electric motor 45.

It is also contemplated to provide as a drive means, instead of the electric motor 45, pneumatic devices or mechanical devices which influence the displacing lever 35 and/or the guide linkage 22. In a particularly simple construction it is possible to fasten a spring to the transverse roof beam 12 and to the guide lever 35. Then, when the sun visor 20 is pushed into its basic position, the spring is tensioned, for example, so that in case of a sudden occurrence of sun glare the user need only actuate one lever which causes a disengagement of the sun visor 20, so that the latter is displaced by the spring into its extended position correspondingly to the actuation of the lever.

The devices illustrated in the drawing, particularly the guide linkage 22, are conveniently provided on both sides of the sun visor 20. In this case the sun visor 20 may be subdivided into specific regions controllable mutually independently, for the driver's side and front seat passenger's side of the motor vehicle, for example, Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Anti-glare device for motor vehicles with at least one sun visor arranged on the under-side of a hollow transverse roof beam located in the region of the windscreen, which device is displaceable from a basic position, in which the sun visor is located approximately below the transverse roof beam, into an extended position, in which the sun visor projects into the region of the windscreen, wherein one guide lever means coupled to the sun visor, is provided as a guide linkage for the sun visor, wherein the guide lever means is articulately connected within a cavity of the transverse roof beam, and wherein a drive means arranged in the cavity is provided which is connected to the sun visor via at least one displacing lever.

2. Anti-glare device according to claim 1, wherein the drive means is controllable by a user.

3. Anti-glare device according to claim 1, wherein the guide lever means is fitted pivotably within the cavity of the transverse roof beam to fastening bolt means or the like.

4. Anti-glare device according to claim 1, wherein the end of the guide lever means projecting out of the cavity of the transverse roof beam is guided in a guide groove of the sun visor.

5. Anti-glare device according to claim 4, wherein the guide groove is arranged parallel to a transverse side of the sun visor.

6. Anti-glare device according to claim 4, wherein the guide lever means includes two guide levers of equal length.

7. Anti-glare device according to claim 1, wherein the displacing lever is attached pivotably to the sun visor on a fastening pin or the like.

8. Anti-glare device according to claim 1, wherein the displacing lever is connected to the end of the sun visor remote from the roof.

9. Anti-glare device according to claim 1, wherein a spring, retained stationary, is provided as the drive means.

10. Anti-glare device according to claim 1, wherein a pneumatic device is provided as the drive means.

11. Anti-glare device according to claim 1, wherein a stationary electric motor is provided as the drive means, which moves an actuating means which influences the displacing leverthrough a drive shaft.

12. Anti-glare device according to claim 11, wherein a rack is provided as actuating means for movement of the visor means.

13. Anti-glare device according to claim 11, wherein a band passed over return pulleys is provided as actuating means for movement of the visor means, on which band the displacing lever is retained by a coupling piece.

14. Anti-glare device according to claim 1, wherein a vanity mirror is arranged between the transverse roof beam and the sun visor, said vanity mirror being configured to be unfolded in the extended position of the sun visor.

15. Anti-glare device according to claim 1, wherein a transverse roof beam casing with a recess adapted to the contour of the sun visor is provided on the side of the transverse roof beam remote from the windscreen.

16. Anti-glare device for motor vehicles of the type having a hollow transverse roof beam located in the region of a vehicle windscreen, comprising:
sun visor means, guide means, attached to the sun visor means and being adapted to guide movement of the sun visor means from a non-use position out of blocking relationship with transparent portions of a vehicle windscreen to a use position in front of the transparent portions of the vehicle windscreen, and
drive means for drivingly moving the sun visor means between its use and non-use positions,
wherein the drive means and guide means are disposed substantially inside a cavity in the hollow transverse roof beam, said drive means being connected by displacing lever means to the sun visor means extending from within said cavity.

17. Anti-glare device according to claim 16, further comprising vehicle passenger accessible control means for controlling the drive means to infinitely adjust the position of the sun visor means.

18. Anti-glare device according to claim 16, wherein the guide means includes guide lever means pivotably supported at one end inside the cavity.

19. Anti-glare device according to claim 18, wherein the opposite ends of the lever means are pivotably and slidably supported in a guide groove at the sun visor means.

* * * * *